United States Patent [19]

McCready

[11] 4,166,874

[45] Sep. 4, 1979

[54] CRASHWORTHY FUEL CELL REPAIR

[75] Inventor: John E. McCready, Rome, Ga.

[73] Assignee: The United States of America as represented by the Secretary of the Army, Washington, D.C.

[21] Appl. No.: 944,819

[22] Filed: Sep. 22, 1978

[51] Int. Cl.$^2$ .................... B65D 25/00; C08L 75/08
[52] U.S. Cl. ............................. 428/35; 220/88 R; 428/63; 428/247; 428/272; 428/419; 428/425; 428/539; 428/911; 528/64
[58] Field of Search ............... 428/35, 63, 911, 423, 428/425, 247, 272, 419, 539; 220/88 R; 260/858

[56] References Cited
U.S. PATENT DOCUMENTS

| | | | |
|---|---|---|---|
| 3,998,870 | 12/1976 | Carlson | 260/858 |
| 4,021,414 | 5/1977 | Saracsan | 428/35 |

OTHER PUBLICATIONS

"Fuel Cell Ballistic Repair and Fitting Replacement" Final Technical Report CDR 235, Young et al.

*Primary Examiner*—George F. Lesmes
*Assistant Examiner*—E. Rollins Buffalow
*Attorney, Agent, or Firm*—Nathan Edelberg; Norman L. Wilson, Jr.

[57] ABSTRACT

The need for crash-resistant fuel tanks to eliminate or minimize post-crash fires is well known. An equally well known fact is that such tanks, when ruptured ballistically or by impact, are very difficult to repair. Many materials have been tried, but without success. The variety of materials such as metal, plastic and nylon, which must be bonded to make a satisfactory repair renders the repair problem particularly challenging. A combination of bonding matrixes has been found which has resulted in a desirable fuel cell repair system.

5 Claims, No Drawings

CRASHWORTHY FUEL CELL REPAIR

The invention herein described was made under a Government contract with the Department of the Army. The project was described in Final Technical Report CDR-235, FUEL CELL BALLISTIC REPAIR AND FITTING REPLACEMENT, AD-A027178, Oct. 1, 1976, Contract DAAJ02-73-0002 (PIG). However, the report is not considered sufficiently definitive to bar this application.

BACKGROUND OF THE INVENTION

This invention, broadly, relates to the repair of crash-resistant fuel tanks for helicopters and light aircraft.

The United States Army is deeply committed to improving the safety and survivability of its helicopter fleet. Two major developments have provided significant advances in this area, the ballistic and crashworthy fuel systems, and the crash attenuated armored pilot seats. The former provides protection from post-crash fires and the latter affords protection from crash impact forces.

The need for crash-resistant fuel systems to eliminate or minimize the probability of post-crash fires was demonstrated in Southeast Asia where crewmen died from such fires in otherwise survivable accidents. The need for ballistic tolerances also became evident at that time.

The flammable helicopter fluids are fuel, oil, and hydraulic fluid. The confinement of these fluids in a crash prevents the formation of readily combustible mixtures and, in addition, isolates the flammable fluids. The major crash-fire hazards, therefore, generally are associated with the fuel. It has been concluded that efforts toward a solution of the crash-fire problem can be concentrated mainly on the fuel tanks and those components and accessories which are associated directly with the tanks.

In the development of crash-resistant fuel systems the approach has been to build an elastomeric fuel cell capable of withstanding a scientifically determined maximum survivable crash impact at a velocity of 64.7 feet per second. Its derivation is the result of extensive analysis of accident data and corresponds to the 95 percentile accident of a fixed wing transport aircraft. However, it long has been recognized that the ability of a fuel cell to remain intact during a crash is influenced to an appreciable extent by the accessories which are attached to it. These accessories include filler necks, fuel pumps, vents, interconnectors, outlets, fuel quantity gauges, drains, hanger fittings, fuel dump valves, and so forth. Because of rigid attachment to the aircraft structure, many of these accessories have been found in actual crashes to tear or otherwise damage the cells. During crashes, forces often exist which tend to move the fuel cell with respect to adjacent cells or with respect to the aircraft structure which surrounds and supports it. This movement often causes fuel-cell tearing at points of attachment. This means that most of the tears occur at the interface of metal and elastomeric material. Such tears pose a particularly difficult repair problem. Many materials simply will not form sufficiently strong bonds to both metal and elastomers. An equally difficult problem is that of repairing ballistically punctured crashworthy fuel cells. Amplifying the problem has been the requirement that cells be repaired in twenty-four hours at ambient temperatures. The composition of the fuel tank was also a factor in the solution of the problem.

In an effort to solve these problems extensive research was conducted. Since the fuel tanks are generally rubber-impregnated nylon it was found that if the bonding agent was too rigid stresses were created causing cell rupture. Many bonding agents did not have sufficient adhesion to be suitable. Others lacked resistance properties required of a fuel cell.

Rendering many bonding agents unsuitable was the variety of substrates. It was necessary to obtain excellent adhesion to metal, to nylon, and to various plastics forming or sealing the cell. A composition forming a strong bond with one of the materials would not necessarily bond the other materials. Still other bonding matrixes did not meet the twenty-four hour curing schedule. It is indeed difficult to find a single bonding matrix which is totally satisfactory.

SUMMARY OF THE INVENTION

In accordance with the practice of this invention it was found that the problem of repairing crashworthy fuel cells could be solved by use of a combination of matrixes with selected curing agents. To maintain the crashworthy, self-sealing character of rubber-impregnated nylon fuel cells which require fittings, or which have been ballistically damaged or torn on impact, a composition for the repair of such ruptures has been developed which includes two curing matrixes. The first matrix, when separated, contains the curing agent for the second matrix. The second matrix, on the other hand, contains the curing agent for the first. The first matrix is a diisocyanate-caprolactone polyol reaction product in admixture with a metal oxide polysulfide curing agent. The diisocyanate-caprolactone polyol reaction product is in the form of an isocyanate terminated polyurethane prepolymer having 1 to 10 isocyanate groups and a molecular weight of 800 to 5,000.

The second matrix is a sodium polysulfide-organic dihalide reaction product in the form of a thiol terminated liquid polysulfide polymer having a molecular weight of 1,000 to 10,000, and bis-(ethylene oxy) methane groups joined by disulfide linkages, in admixture with an aromatic diamine which cures the polyurethane.

DETAILED DESCRIPTION OF THE INVENTION

In a crash, forces tending to move aircraft fuel cells in any direction with respect to each other will exist. Hence such cells must be fabricated of elastomeric materials. Proving to possess the most merit for preventing spillage of fuel during crashes has been a cell made of nylon impregnated with an acrylonitrile-butadiene copolymer, in other words a nylon-reinforced acrylonitrile-butadiene fuel cell. The burst tensile strength of the materials on impact will vary from 200 to 1,000 pounds per inch of width. Hence the repair of such cells involves providing materials capable of operating under such conditions without tearing away. The combination of matrixes herein meet such demands, provided the criteria set forth herein are met.

The first matrix is primarily a polyurethane prepolymer. Polyurethanes are well known, usually being prepared by solution polymerization. As an example a polyol is added to an isocyanate solution at such a rate that the temperature does not exceed 50° C. to 60° C., a slight exotherm being obtained. After the addition the reaction temperature is increased to 60° to 100° C. to complete the polymerization. One of the aforementioned criteria is that by the practice of this invention the polyhydric alcohol employed must be a caprolactone polyol. Caprolactone polyols are commercially available. They are low molecular weight polyols formed by reacting caprolactone with a glycol. These polyols are liquid hydroxy terminated polyesters that is low molecular weight hydroxy polyesters having molecular weights of 500 to 800. The isocyanate reacted with this caprolactone polyol desirably is an aromatic or cycloaliphatic diisocyanate, for example, toluene diisocyanate, methylenediphenyl diisocyanate, methylenedicyclohexyl diisocyanate, isophorone diisocyanate, and the like. The polyurethane prepolymer prepared as described from the caprolactone and diisocyanate will have a molecular weight of 800 to 4,000 preferably 1,000 to 3,000 and will contain 1 to 10 percent, desirably 3 to 8 percent —NCO groups available for crosslinking.

The second matrix forming the repair composition is a polysulfide polymer. Liquid polysulfide polymers are also well known, being thiol terminated reaction products. The liquid polysulfide polymers can be made by reacting an organic dihalide with sodium polysulfide at elevated temperatures. Another method involves the reaction of bis-chloroethyl formal with a sodium polysulfide solution. The resulting high molecular weight polymer is than split into lower molecular weight liquid polymers by reaction with sodium hydrogen sulfite and sodium hydrosulfide. The liquid polysulfide polymers contain about thirty to thirty seven percent sulfur which gives them their unique chemical properties. They are polymers of bis-(ethylene oxy) methane containing disulfide linkages and molecular weights of 1,000 to 10,000.

Referring now to the two matrixes it has ben mentioned that one matrix contains the curing agent for the other. Thus liquid polysulfide polymers are generally cured with oxygen donating materials such as metal oxides, for instance lead dioxide, manganese dioxide, calcium peroxide and zinc peroxide. Accordingly to provide for the desired shelf lives of the two matrixes, these metal oxides are incorporated in the polyurethane matrix. The diisocyanate-caprolactone polyol prepolymer on the other hand can be cured with an amine. By the practice of this invention for effective results the amine must be an aromatic diamine, for instance cumene diamine, meta-phenylenediamine, methylene dianiline, diaminodiphenyl sulfone and others. This aromatic amine is, therefore, incorporated in the liquid polysulfide matrix.

It will be understood that other components can also be added to either matrix. Thus solvents such as the ketones and aromatic solvents can be employed. Examples are toluene, acetone, methylethyl ketone, and, to a lesser extent, benzene. Other compatable materials such as pigments and other colorants, extenders, and modifiers can be added to either matrix. As an example it is preferred to add carbon black to the polysulfide matrix in an amount of 1 to 5 weight percent based on polysulfide polymer.

The use of the two matrixes will now be considered. As pointed out, separately, the two matrix compositions have excellent shelf lives, over one year. When combined the blend has a pot life of approximately 20 minutes and will room temperature cure in twenty-four hours. The materials are mixed with a spatula and applied with that spatula or a stiff brush. In combining the two matrixes it is preferred that approximately equal parts by weight based on the polymers be employed. Desirable results are not obtained if the ratio of one matrix to the other is greater than 3:2.

To illustrate the invention the following specific example and test results are given.

EXAMPLE

A fuel cell repair composition was prepared from two mixes having the following compositions:

| Composition 1 | Gallons |
|---|---|
| Polyurethane prepolymer | 95.89 |
| Red lead (oil dispersion) containing percent lead) | 4.11 |
| | 100.00 |
| Composition 2 | |
| Liquid polysulfide | 87.48 |
| Carbon black | 1.00 |
| Aromatic diamine | 11.52 |
| | 100.00 |

The repair material was prepared by blending 53.53 gal of Composition 1 with 46.47 gal of Composition 2. The polyurethane prepolymer of Composition 1 was an isocyanate terminated caprolactone polyol-disocyanate reaction product which had an excess of 6.6 percent-NCO, and which was liquid at room temperature (ml wt approx 1250). The aromatic diamine was a mixture of 58 percent cumene diamine and 42 weight percent phenylene diamine (90 percent solids). The liquid polysulfide of Composition 2 had a molecular weight of approximately 1000 (viscosity 90 poises at 4° C.) and a mercaptan content of 5.9–7.7.

With the repair material of the foregoing example fuel cells ruptured ballistically and by impact have been repaired. To effect these repairs the area around the rupture was buffed and a layer of the repair material was applied with a spatula. A nylon cloth patch was then pressed on to the layer, becoming impregnated with the repair material. A second layer of repair material was applied over the impregnated cloth to complete the repair. The repaired surfaces allowed to cure 12 to 18 hours prior to use.

Using the repair material and procedure described, helicopter model UH-1, OH-58 and CH-47 fuel cells were repaired and tested. Each cell was purposely ruptured by gun fire so as to have one to four bullet holes, and each had a fitting torn away. Using repair materials other than the repair materials of the invention some patches leaked on standing. Others appeared satisfactory on standing but less than 20 percent passed the 65 foot drop test. The drop test is a particularly severe test. The tank is filled with water, lifted 65 feet, and dropped on concrete. The criterion is very precise; the tank cannot leak; and there are no exceptions. This is the equivalent of driving a tank at 45 miles per hour into a brick wall. It is a terrific impact, and in an actural accident the tank withstands a higher drop and impact velocity, because the crushing effect of an aircraft structure around it acts as a shock absorber. Using the repair materials of this invention 80 to 90 percent of the fuel cells passed the drop test. The success of the patch also depends upon how long the cells stand with ruptures exposed to fuel. Through capillary action fuel is drawn into the fibers and swelling results. The success of the repair depends upon the amount of swelling. It has also been found that too many patches introduce uneven stresses making the fuel cell prone to rupturing on the drop test at some point other than where it was repaired.

Taking these two considerations into account the repair material of this invention is highly satisfactory. It does not sag on a vertical surface. The material bonds well to cured polyurethanes, cured nitriles, fuel tank fabrics, and to other commonly used fuel tank materials. Relative to its bonding properties, a typical peel adhesion value of a cured and buffed nitrile fuel tank compound bonded to itself with a thin layer of the polysulfide-polyurethane material of the invention is 28 lb per inch after 24 hours.

A typical peel adhesion value of a resorcinol-formaldehyde treated nylon cloth bonded to itself with a thin layer of the polysulfide-polyurethane material cured for 24 hrs is 20 lbs per inch. The samples were tested at a jaw opening rate of 2 inches per minute with a pull angle of 180°. These same tests were performed on a variety of other bonding materials, including ten well known bonding agents. All of these materials gave similar results in one instance, but not in both. Some bonded well to the treated nylon but not to the nitrile. Others bonded well to nitrile but not to treated nylon. In fact a sample of primed aluminum was even bonded to resorcinol-formaldehyde treated cloth utilizing a thin layer of the polysulfide-polyurethane material of the invention. A one inch square area of this build-up was tested in shear with a jaw opening rate of 20 inches per minute. The shear adhesion value was 1300 lbs per inch.

This invention thus provides a desirable crashworthy fuel cell repair system. The particular blend of polyurethane-polysulfide and curing agents used in the ballistic tests and in actual fuel tank repair use, was chosen because it had the best balance of properties of those tried, good adhesion to fuel tank components; easy-to-use viscosity; easy mixing; room temperature curing; adequate pot life; good storage stability; good fuel resistance; a liquid at room temperature; and, no solvents (100% solids). Variations will, of course, occur to those skilled in the art. Thus, to render the tank more impermeable to fuels it is desirable to cover the patched area with a layer of polyvinylidene chloride or similar barrier film prior to overcoating it with the polysulfide-polyurethane layer. It may also be desirable to apply several layers of patches with polysulfide-polyurethane sandwiched in between. The polyvinylidene chloride layer can also be used between each patch layer. Such modifications and ramifications are deemed to be within the scope of this invention.

What is claimed is:

1. An elastomeric crashworthy fuel tank having a portion of its body formed of a fabric impregnated with a metal oxide cured polysulfide polymer in combination with an aromatic diamine cured urethane polymer, the urethane being a diisocyanate-caprolactone polyol reaction product in the form of an isocyanate terminated prepolymer having 1 to 10 isocyanate groups and a molecular weight of 800 to 5,000, the polysulfide being a sodium polysulfide-organic dihalide reaction product in the form of a liquid thiol terminated polymer having a molecular weight of 1,000 to 10,000 and bis-(ethylene oxy) methane groups joined by disulfide linkages.

2. A composition for sealing, coating and bonding a nylon patch or fitting to a nylon-reinforced acrylonitrile-butadiene aircraft crashworthy fuel tank comprising a combination of two curing matrixes, the first matrix, when separated, containing the curing agent for the second matrix, the second matrix containing the curing agent for the first, the first matrix being a diisocyanate-caprolactone polyol reaction product in the form of an isocyanate terminated polyurethane prepolymer having 1 to 10 isocyanate groups and a molecular weight of 800 to 5,000, in admixture with a metal oxide polysulfide curing agent, the second matrix being a sodium polysulfide-organic dihalide reaction product in the form of a thiol terminated liquid polysulfide polymer having a molecular weight of 1,000 to 10,000, and bis(ethylene oxy) methane groups joined by disulfide linkages, in admixture with an aromatic diamine which cures the polyurethane.

3. The composition of claim 3 wherein the second matrix contains carbon black.

4. The composition of claim 3 wherein the metal oxide is lead dioxide.

5. The composition of claim 3 wherein the polyurethane prepolymer has a molecular weight of 1,000 to 3,000.

* * * * *